THOMAS J. MAYALL.
Improvement in Rubber Flanged Tubing for Packing, &c.
No. 125,594.  Patented April 9, 1872.
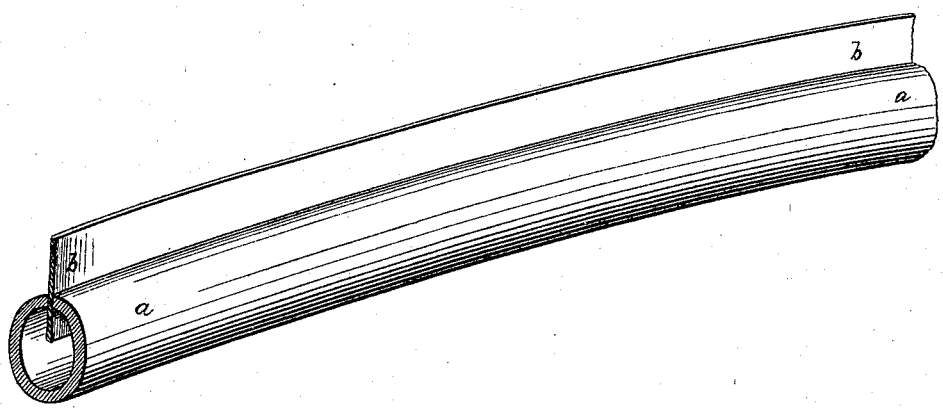
Witnesses.
C. B. Nottingham
J. R. Nottingham
Inventor.
Thos. J. Mayall
by atty A. Pollok

125,594

UNITED STATES PATENT OFFICE.

THOMAS JEFFERSON MAYALL, OF BOSTON, MASSACHUSETTS.

IMPROVEMENT IN RUBBER-FLANGED TUBINGS FOR PACKING, &c.

Specification forming part of Letters Patent No. 125,594, dated April 9, 1872.

*To whom it may concern:*

Be it known that I, THOMAS J. MAYALL, of Boston, Suffolk county, Massachusetts, have invented certain new and useful Improvements in Vulcanized India-Rubber Flanged Tubing, of which the following is a specification:

My invention consists of vulcanized India-rubber flanged tubing, made by bringing together the longer edges of a strip of vulcanizable rubber compound upon or on each side of, and uniting them with, an interposed flanged strip, composed preferably of a fabric, coated on both sides with vulcanizable rubber and so arranged as to project beyond the body of the tubing and form a longitudinal fin upon the exterior of the tubing; the two strips, when thus put together, being then vulcanized in the usual way.

In the accompanying drawing I have shown flanged vulcanized India-rubber tubing made in accordance with my invention.

$a$ is the body of the tubing, made of any suitable vulcanizable compound. $b$ is the flange strip, made of fabric, coated on both sides with rubber, as above described. The two parts are put together while the rubber is still in the green state, the longer edges of the strip, from which the tube $a$ is formed, being bent toward each other, so as to meet upon opposite sides of the interposed flange-strip $b$. The edges of the strip $a$ should be previously moistened with camphene or other solvent, or with a rubber cement or solution, in order to cause them to adhere properly to the interposed flange-strip. As above stated, the tubing after having been formed is vulcanized.

Tubing of this kind can be made of any diameter and length required. In Letters Patent of the United States of even date herewith, issued to me for machinery for manufacturing vulcanized India-rubber flanged tubing, I have described a machine which may be economically and advantageously used to make this tubing. But I do not wish to limit my claim, as regards the present invention, to that special mechanism, as my improved flanged tubing may be made by hand or by any suitable machinery.

Tubing thus made is useful for various purposes—as a packing, for instance, or for a weather strip, or other uses—the tubing being held in the required position for use by tacking or cementing the flange to the part to which the tubing is to be attached.

What I here claim as my invention, and desire to secure by Letters Patent, is—

As a new article of manufacture, vulcanized India-rubber flanged tubing made substantially as herein shown and described.

In testimony whereof I have signed my name to this specification before two subscribing witnesses.

THOS. J. MAYALL.

Witnesses:
A. POLLOK,
EDM. F. BROWN.